US009535405B2

(12) United States Patent
Zaugg et al.

(10) Patent No.: US 9,535,405 B2
(45) Date of Patent: Jan. 3, 2017

(54) CHRONOGRAPH MECHANISM

(71) Applicant: Montres Breguet S.A., L'Abbaye (CH)

(72) Inventors: Alain Zaugg, Le Sentier (CH); Stefan Rombach, Bienne (CH); Dominique Lechot, Reconvilier (CH); Jean-Philippe Rochat, Les Bioux (CH)

(73) Assignee: Montres Breguet S.A., L'Abbaye (CH)

( * ) Notice: Subject to any disclaimer, the term of this patent is extended or adjusted under 35 U.S.C. 154(b) by 0 days.

(21) Appl. No.: 15/044,451

(22) Filed: Feb. 16, 2016

(65) Prior Publication Data

US 2016/0246261 A1 Aug. 25, 2016

(30) Foreign Application Priority Data

Feb. 23, 2015 (EP) .................................... 15156071

(51) Int. Cl.
*G06F 7/08* (2006.01)
*G04F 7/08* (2006.01)

(52) U.S. Cl.
CPC ............... *G04F 7/0804* (2013.01); *G04F 7/08* (2013.01)

(58) Field of Classification Search
CPC ........ G04F 7/0804; G04F 7/08; G04F 7/0866; G04F 7/0823; G04F 7/0809; G04F 7/0814
See application file for complete search history.

(56) References Cited

U.S. PATENT DOCUMENTS 7,293,911 B2 * 11/2007 Bonvin .................. G04F 3/022 368/106
8,337,075 B2 * 12/2012 Haenzi .................. G04F 7/0814 368/101
8,588,035 B2 * 11/2013 Goeller .................. G04B 21/12 368/267
8,599,651 B2 * 12/2013 Goeller .................. G04B 21/12 368/244
9,239,570 B2 * 1/2016 Graemiger ............. G04B 19/02
2007/0091727 A1 4/2007 Bonvin et al.

FOREIGN PATENT DOCUMENTS

CH 703 797 B1 3/2012
EP 1 777 598 A1 4/2007

OTHER PUBLICATIONS

European Search Report issued Dec. 3, 2015 in European Application 15156071 filed on Feb. 23, 2015 ( with English Translation).

* cited by examiner

*Primary Examiner* — Sean Kayes
(74) *Attorney, Agent, or Firm* — Oblon, McClelland, Maier & Neustadt, L.L.P.

(57) ABSTRACT

A chronograph mechanism including an energy accumulator, a regulating system, a chronograph counter train including a minute-counter having a minute wheel set and at least one minute indicator member, and a seconds-counter having a seconds wheel set and a seconds indicator member, a chronograph zero-reset mechanism including a minute zero-reset mechanism. The minute zero-reset mechanism is arranged to cooperate with the minute wheel set, the minute indicator member being permanently integral with the minute wheel set, and the chronograph counter train includes an uncoupling device between the minute-counter and the seconds-counter, arranged to kinematically connect the minute wheel set and the seconds wheel set during the counting and to uncouple the seconds wheel set from the minute wheel set when the chronograph mechanism is reset to zero.

13 Claims, 4 Drawing Sheets

CHRONOGRAPH MECHANISM

This application claims priority from European Patent Application No. 15156071.1 filed on Feb. 23, 2015; the entire disclosure of which is incorporated herein by reference.

FIELD OF THE INVENTION

The invention relates to the field of mechanical horology. It concerns, more specifically, a chronograph mechanism comprising an energy accumulator, a regulating system, a chronograph counter train comprising a seconds-counter and a minute-counter, a mechanism for resetting the chronograph to zero comprising a mechanism for resetting the minutes to zero. The present invention also concerns a timepiece including such a chronograph mechanism.

BACKGROUND OF THE INVENTION

Chronograph mechanisms generally comprise a chronograph counter train which can count the time from the second, by means of a chronograph wheel set or seconds-counter, to the minute, by means of a minute-counter, and possibly to the hour, by means of an hour-counter. Each counter comprises an indicator member moving on a corresponding graduated scale. When the chronograph is reset to zero, the indicator members are conventionally indexed to an angular position corresponding to the zero on each graduated scale. Therefore, the indicator members are generally carried by the arbor of a corresponding gear train element, and there is a friction connection between the gear train element and its arbor to allow for an independent angular motion of the two members beyond a certain torque. The indicator members are indexed by means heart-piece mechanisms and corresponding hammers. The use of friction connections and heart-piece mechanisms and hammers means that the torque to be provided when the various counters are reset to zero is very high, and that a large quantity of energy will be consumed simply to reset the various counters to zero. Accordingly, the manufacturer is obliged to provide a suitable energy accumulator, generally a barrel of sufficient size to provide the required energy. This creates a congestion problem, in particular in the case of a timepiece comprising a basic time movement and an autonomous chronograph movement, having its own movement and therefore its own barrel. It is therefore necessary to have mechanisms that use less energy when the chronograph is reset to zero. More specifically, it is necessary to have a chronograph zero-reset mechanism other than a friction system controlled by heart-pieces and hammers.

SUMMARY OF THE INVENTION

It is an object of the invention to overcome the various drawbacks of known chronograph zero-reset mechanisms.

More specifically, it is an object of the invention to provide a chronograph mechanism comprising a zero-reset mechanism that does not use friction connections and has low power consumption.

To this end, the present invention concerns a chronograph mechanism comprising an energy accumulator, a regulating system, a chronograph counter train comprising a seconds-counter having a seconds wheel set and a seconds indicator member and a minute-counter having a minute wheel set and at least one minute indicator member, a chronograph zero-reset mechanism comprising a minute zero-reset mechanism.

According to the invention, the minute zero-reset mechanism is arranged to cooperate with the minute wheel set, the minute indicator member being permanently integral with the minute wheel set in order to move therewith including during the zero-reset function, and the chronograph counter train comprises an uncoupling device between the minute-counter and the seconds-counter, arranged to kinematically connect the minute wheel set and the seconds wheel set during the counting (when the chronograph is operating) and to uncouple the seconds wheel set from the minute wheel set when the chronograph mechanism is reset to zero.

Thus, the chronograph mechanism according to the invention comprises a minute zero-reset mechanism to maintain the indexing of the gear train, and particularly of the minute wheel set, to the minute indicator member. Such a mechanism does not require a friction connection for the minute-counter and saves the torque delivered by the energy accumulator when the chronograph is reset to zero.

Advantageously, this uncoupling device may comprise a unidirectional mechanism having a drive direction of rotation for driving the seconds-counter via the minute-counter during the counting and a free direction of rotation when the chronograph mechanism is reset to zero.

Preferably, the uncoupling device may comprise a drive wheel set arranged to be driven by the minute-counter and a planetary wheel holder, which is arranged to drive the seconds-counter and on which at least one planetary wheel, cooperating with the drive wheel set, is mounted for free rotation, said planetary wheel being arranged to allow the planetary wheel holder to be driven by the drive wheel set during the counting and to let the planetary wheel holder rotate freely when the minutes are reset to zero.

Preferably, the drive wheel set may comprise a drive pinion arranged to cooperate with the minute-counter and a drive wheel arranged to cooperate with the planetary wheel.

Advantageously, the planetary wheel holder may be arranged to carry n planetary wheels, where n is an integer number greater than or equal to 1, said planetary wheel holder being disposed substantially coaxially to the drive wheel arbor and being movably mounted to rotate about said arbor.

Advantageously, the planetary wheel may have an asymmetrical tooth profile arranged to lock with the drive wheel set during the counting and to rotate freely when the minutes are reset to zero.

Preferably, the minute wheel set may comprise a first toothed sector arranged to cooperate with the energy accumulator and a second toothed sector arranged to cooperate with the uncoupling device, the first and second toothed sectors being integral in rotation.

Advantageously, the first and second toothed sectors are integral with an arbor carrying a first minute indicator member on the side of the first toothed sector, and the second toothed sector carries a second minute indicator member.

Preferably, the minute zero-reset mechanism may comprise a rack arranged to cooperate with the first toothed sector of the minute-counter and mounted to pivot in one direction of rotation to reset the minute-counter to zero. The rack is also arranged to wind the energy accumulator at the same time that the minute-counter is reset to zero. Thus, no specific winding mechanism is required for the accumulator.

Advantageously, the energy accumulator may be a strip-spring.

Preferably, the rack of the minute zero-reset mechanism may also be mounted to pivot in an opposite direction of rotation to drive the chronograph counter train, so as to form drive means for the chronograph counter train, the strip-spring being arranged to actuate said rack.

The present invention also concerns a timepiece including such a chronograph mechanism.

BRIEF DESCRIPTION OF THE DRAWINGS

Other characteristics and advantages of the invention will appear more clearly upon reading the following description of a specific embodiment of the invention, given simply by way of illustrative and non-limiting example, and the annexed Figures, among which.

DETAILED DESCRIPTION OF THE INVENTION

Figure 1:
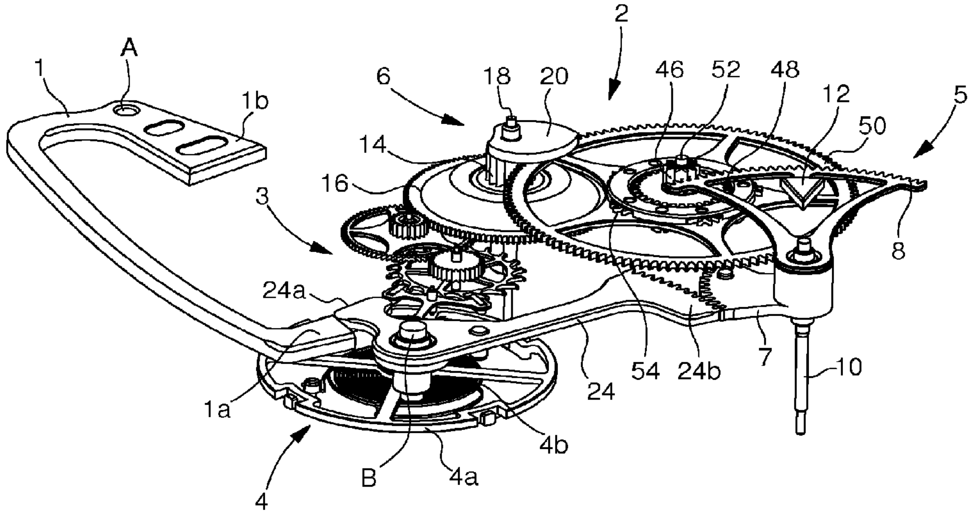
FIG. 1 is a perspective view of the chronograph mechanism according to the invention before it is first started.

Referring to FIG. 1, the chronograph mechanism comprises an energy accumulator 1, formed by a strip-spring fixed on the frame at A, a going train 2, an escapement system 3 and a regulating system 4 comprising a balance 4*a* and a balance spring 4*b*, said going train 2 connecting energy accumulator 1 to escapement system 3 and to regulating system 4. Thus, the chronograph mechanism comprising its own chronograph movement is autonomous or independent and can be used in a timepiece comprising its own horological movement.

The going train comprises a minute-counter and a seconds-counter so as to also form a chronograph counter train. The going train or chronograph counter train is referred to generally hereafter as the "gear train". More specifically, the gear train comprises a minute-counter 5 and a seconds-counter 6. Minute-counter 5 comprises a minute-wheel set comprising a first toothed sector 7 arranged to cooperate with the energy accumulator, as will be described in detail below, and a second toothed sector 8 arranged to cooperate with the gear train. The first and second toothed sectors 7, 8 are permanently fixedly mounted on arbor 10 of minute-counter 5 so that they are constantly integral in rotation, including with arbor 10. There is no friction connection which could angularly uncouple arbor 10 from one of toothed sectors 7, 8 beyond a certain torque. Arbor 10 integrally carries a first minute indicator member (not shown), such as a hand, arranged to appear on the dial side. A second minute indicator member 12, such as an index, is carried by second toothed sector 8 to appear on the back cover side. Seconds-counter 6 comprises a seconds-wheel set comprising a seconds pinion 14 arranged to cooperate with minute-counter 5 and a seconds wheel 16 arranged to cooperate with regulating system 4. Arbor 18 of the seconds-wheel set integrally carries a seconds indicator member (not shown), such as a hand. There is a friction connection between the seconds-wheel set and its arbor 18 to allow for an independent angular motion of these two members beyond a certain torque.

The chronograph mechanism also comprises a zero-reset mechanism comprising a mechanism for resetting the minutes to zero and a mechanism for resetting the seconds to zero. The seconds zero-reset mechanism is a conventional reset mechanism implementing a system with a heart-piece 20 integral with arbor 18 of the seconds-wheel set, and a hammer (not shown) controlled by a reset push-piece 22 (cf. FIG. 2).

According to the invention, the minute-zero reset mechanism comprises a rack 24 having one end 24*a* arranged to cooperate with energy accumulator 1, as will be described hereafter, and another end 24*b* having a toothing arranged to cooperate with first toothed sector 7 of the minute-wheel set. Rack 24 is mounted to pivot on the frame at B, and is arranged to pivot in one direction to ensure the minute zero-reset and energy accumulator winding functions, and to pivot in the other direction to ensure the function of driving the gear train, and, more specifically, the minute-counter during counting, when the chronograph mechanism is in operation. Thus, rack 24 forms not only the gear train drive means and the minute zero-reset mechanism but also the mechanism for winding strip-spring 1.

To ensure its function as the gear train drive means, end 24*a* of rack 24 is arranged to be actuated by the free end 1*a* of strip-spring 1 and to pivot rack 24 when strip-spring 1 releases its energy and relaxes to return to a non-wound position.

In order to regulate the torque delivered by the strip-spring, the toothing provided at end 24*b* of rack 24 and first toothed sector 7 of minute counter 5 are not concentric. The use of a non-concentric gear system makes it possible to correct the non-constant torque delivered by the strip-spring and consequently to smooth the torque so that the chronograph achieves a constant amplitude and rate.

Figure 3:
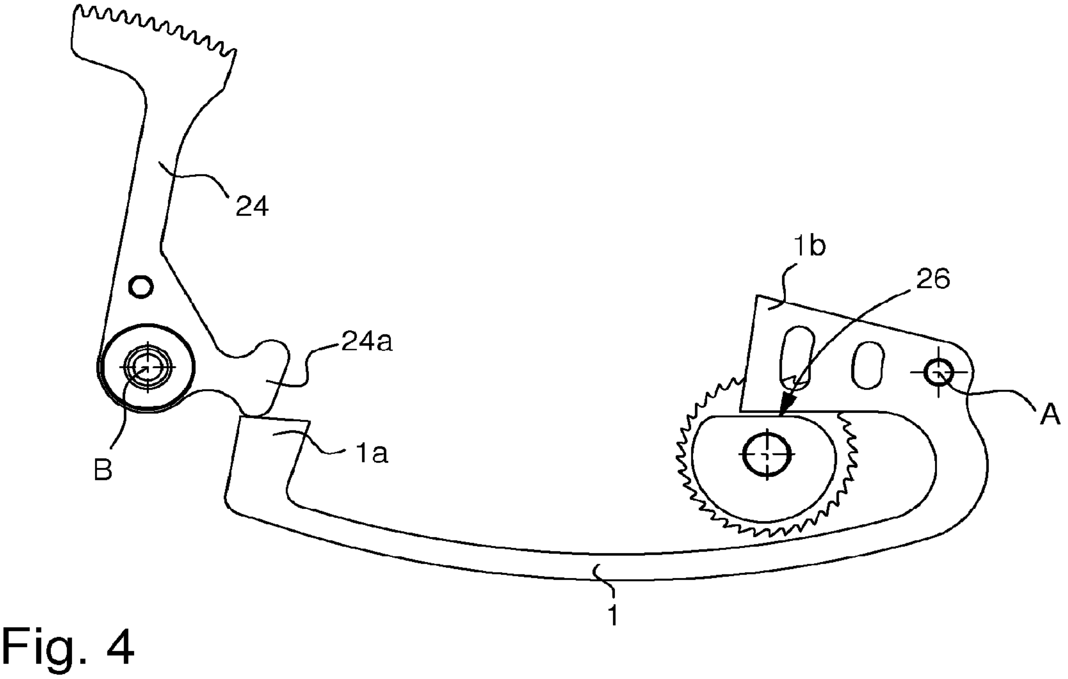
FIG. 3 is a top view (dial side) of the strip-spring and of the torque regulating means in the rest position.
Figure 4:
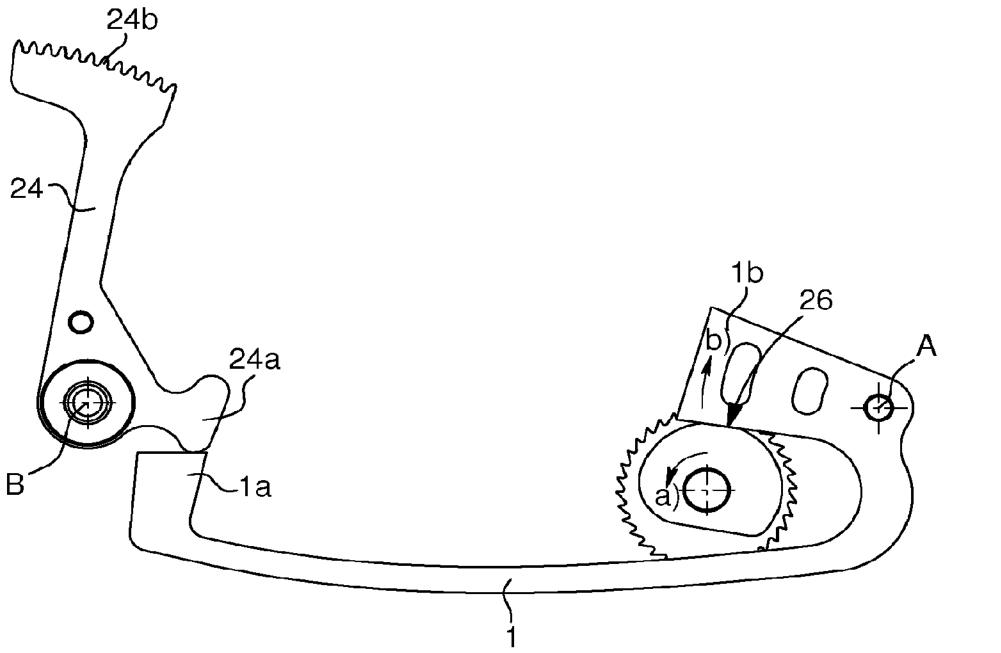
FIG. 4 is a top view (dial side) of the strip-spring and of the torque regulating means in the wound position.

In order to regulate the torque delivered by the strip-spring, the chronograph mechanism comprises a torque regulating device. Referring to FIGS. 3 and 4, this torque regulating device comprises an eccentric cam 26, which can be adjusted by the manufacturer by means of a key. Cam 26 is disposed in proximity to end 1*b* of strip-spring 1, beyond point A, opposite the free end 1*a*. During the assembly of strip-spring 1, cam 26 is disposed so that it is not in contact with end 1*b*, as shown in FIG. 3. In order to regulate the torque to be delivered, cam 26 is rotated in the direction of arrow a as shown in FIG. 4, so that it is in contact with end 1*b* of strip-spring 1 and in order to pivot end 1B more or less about point A in the direction of arrow b to adjust the tension of strip-spring 1 in its wound position. The assembly is then secured by means of screws.

Figure 5:
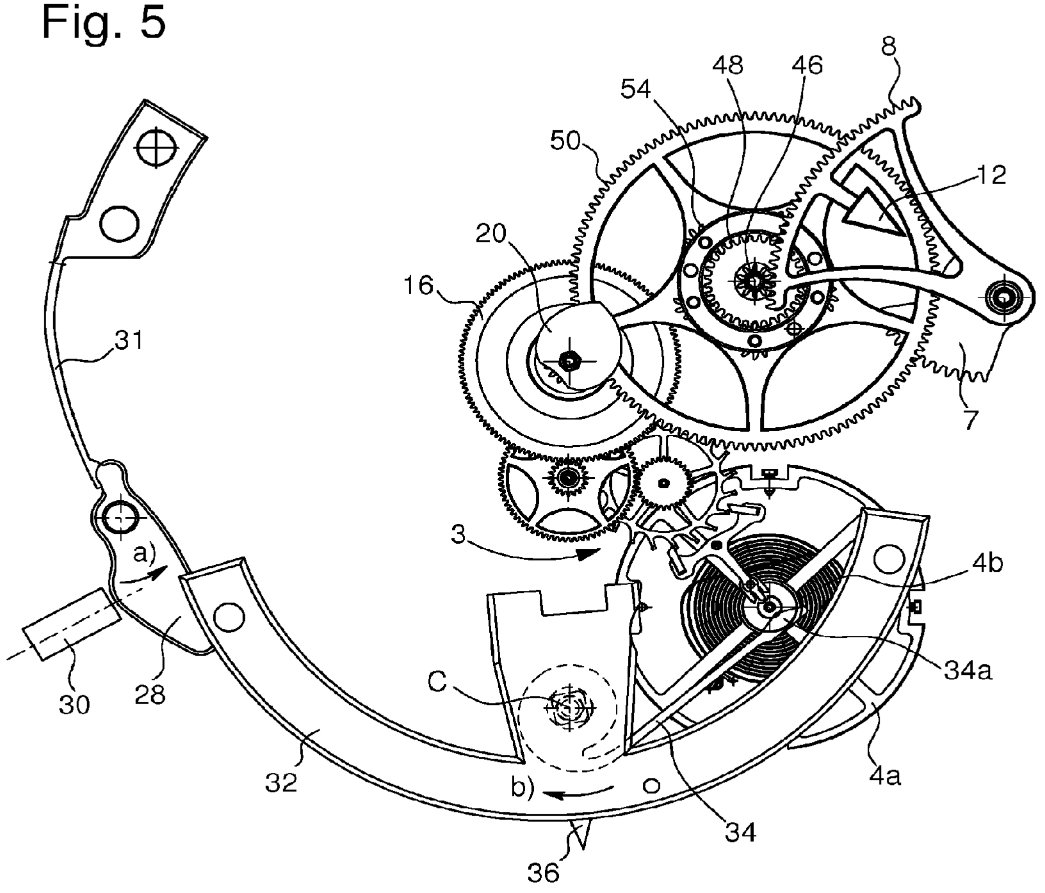
FIG. 5 is a bottom view (back cover side) of the chronograph mechanism according to the invention and its mechanism for starting the counting.

The chronograph mechanism is kept stopped until it is started by means of a mechanism for starting the counting, arranged to release the regulating system when counting starts. Referring to FIG. 5, the counting start mechanism comprises a first lever 28 controlled by a "start" push-button 30 and provided with a jumper spring 31. First lever 28 controls a second lever 32 mounted to pivot at C on the frame and carrying a balance stop lever 34 whose free end 34*a* comprises a beak arranged to cooperate with the balance wheel and lock it until the chronograph mechanism is started. Second lever 32 also carries an index 36 which pivots to indicate the state of chronograph.

Figure 2:
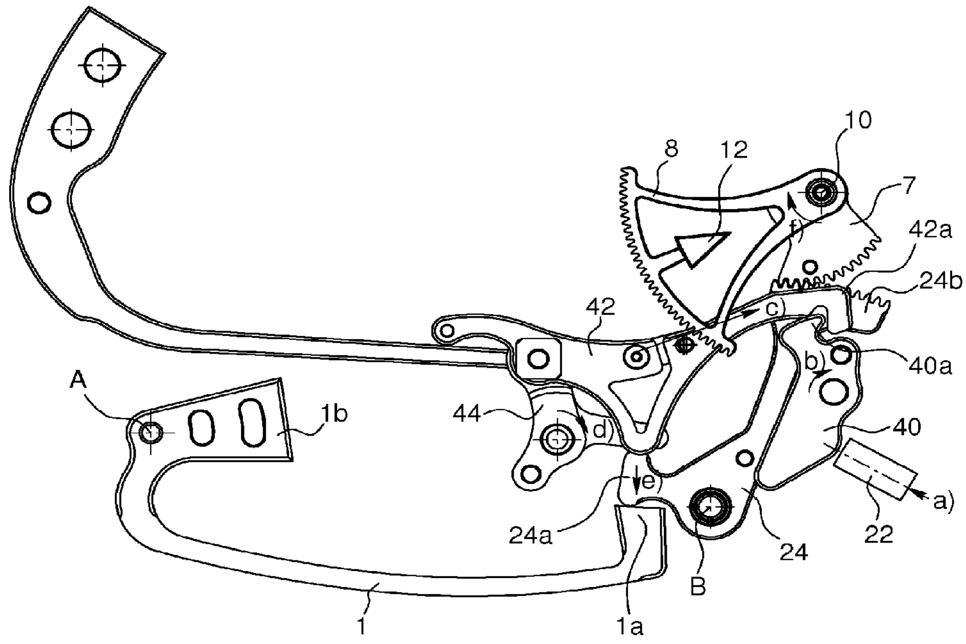
FIG. 2 is a bottom view (back cover side) of the chronograph mechanism according to the invention and of the strip-spring winding and zero reset mechanism.

To be able to perform the minute zero-reset function and the function of winding strip-spring 1 of rack 24 at the same time, the minute zero-reset and strip-spring winding mechanism comprises, referring to FIG. 2, a lever 40 actuated by zero-reset push-button 22. Lever 40 comprises a beak 40*a* which cooperates with the end 42*a* of a first lever 42, the other end cooperating with a second lever 44. This second lever 44 comprises an arm 44*a* arranged to press on end 24*a* of rack 24 and to pivot rack 24 at B. During the pivoting, end 24*a* of rack 24 presses on strip-spring 1 to move and wind the strip-spring while the other end 24*b* of rack 24 causes first toothed sector 7 to pivot in the resetting direction of minute-counter 5. Thus, strip-spring 1 is rewound by means of the minute-counter 5 reset function. No other specific winding action is required.

Figure 6:
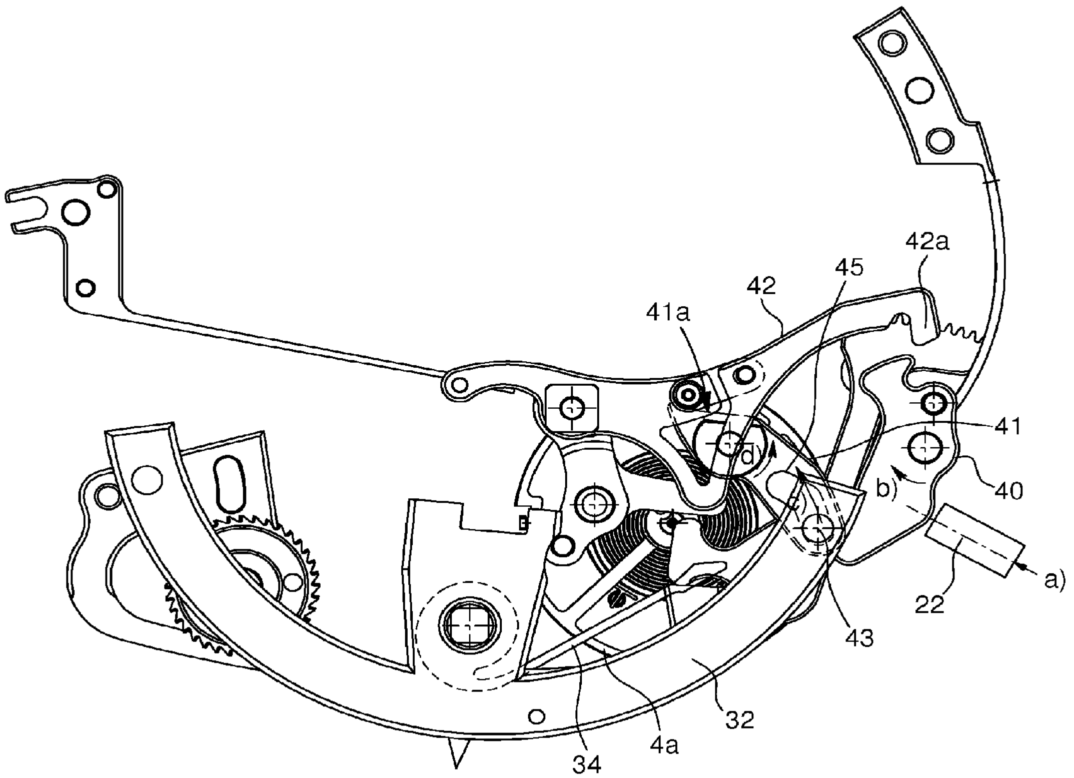
FIG. 6 is a bottom view (back cover side) of the chronograph mechanism according to the invention and its stop mechanism.

To ensure the chronograph mechanism stop function, there is provided a stop mechanism arranged to stop balance 4*a* and the chronograph mechanism indicator members to allow for reading or for a timeout. To this end, zero-reset button 22 is also a chronograph mechanism stop button. Referring to FIG. 6, lever 40 controlled by button 22 also cooperates with lever 32 via a pin 43 which is integral with said lever 32 and moves in an oblong hole 45 provided in a lever 41. The pivoting of lever 40 causes lever 32 to pivot so as to return stop balance lever 34 to a position in which balance 4*a* is locked and to stop the chronograph mechanism, with no zero-reset.

Lever 41 comprises a nose-portion 41*a* arranged to cooperate with lever 42 and to keep its end 42*a* away from beak 40*a* of lever 40 when the zero-reset function is not actuated. The pivoting of lever 32 causes pin 43 to move and pivot lever 41. The configuration is arranged such that, at the end of the chronograph stop function, lever 41 has turned sufficiently to release lever 42, which then falls on lever 40 so that the end 42*a* of lever 42 and beak 48 of lever 40 are locked.

Thus, a first application of pressure on push-button 22 stops the chronograph mechanism and a second application of pressure on the same push-button 22 resets the counters to zero and rewinds the strip-spring.

In order to isolate the seconds wheel set when minute-counter 5 is reset to zero, the gear train comprises an uncoupling device between minute-counter 5 and seconds-counter 6, arranged to kinematically connect the minute-wheel set and the seconds-wheel set during counting, when the chronograph mechanism is operating, and to uncouple the seconds-wheel set from the minutes-wheel set when the minutes are reset to zero. This uncoupling device comprises a unidirectional mechanism having a drive direction of rotation for driving seconds-counter 6 via minutes-counter 5 during counting and a free direction of rotation when the chronograph mechanism is reset to zero. According to a variant embodiment that is not shown, this unidirectional mechanism may be a ratchet wheel.

Figure 7:
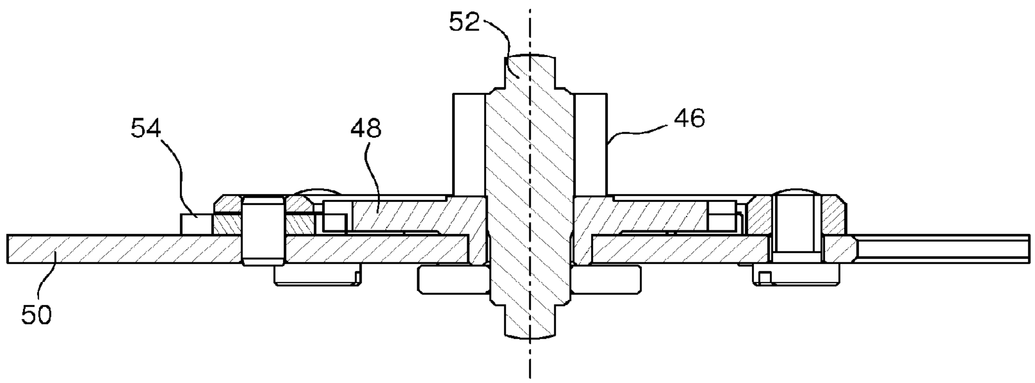
FIG. 7 is a sectional view of the uncoupling device.

According to another embodiment more particularly shown with reference to FIGS. 1, 5, and 7, the uncoupling device comprises a drive wheel set, comprising a drive pinion 46 cooperating with second toothed sector 8 of minute-counter 5 and a drive wheel 48, and a planetary wheel holder 50 arranged coaxially to the drive wheel arbor 52 and movably mounted to rotate about said arbor 52. Planetary wheel holder 50 cooperates with seconds pinion 14 of seconds-counter 6. Said planetary wheel holder 50 carries five, regularly distributed planetary wheels 54, mounted for free rotation. Planetary wheels 54 are arranged to cooperate with drive wheel 48 of the drive wheel set.

Planetary wheels 54 have a unidirectional toothing and an asymmetrical tooth profile arranged to lock with drive wheel 48 when it turns in one direction during counting, and to rotate freely when drive wheel 48 turns in the opposite direction when the minutes are reset to zero and strip-spring 1 is wound.

Thus, planetary wheels 54 make it possible to drive planetary wheel holder 50 via the drive wheel during counting, so as to drive the gear train via minute-counter 5 as far as regulating system 4 during counting, and let said planetary wheel holder 50 rotate freely when the minutes are reset to zero and strip-spring 1 is wound, so as to uncouple the seconds-wheel set from the minute-wheel set, thereby forming another variant of the unidirectional mechanism. Such an uncoupling device may be used with any type of energy accumulator and drive means, independently of the strip-spring/rack system. In particular, it could advantageously be used for winding a movement with a fusee.

The chronograph mechanism according to the invention operates as follows.

The energy required for operation of the chronograph is provided by the user when the chronograph is reset to zero, and more specifically when the minutes are reset to zero which occurs at the same time that strip-spring 1 is wound. To achieve this, the user presses the zero-reset and winding button 22. As shown in FIG. 2, pressure on button 22 in the direction of arrow a causes lever 40 to pivot in the direction of arrow b, which causes first lever 42 to move in the direction of arrow c, which causes second lever 44 and its arm 44*a* to tip in the direction of arrow d. As it tips, arm 44*a* presses on end 24*a* of rack 24 in the direction of arrow e, which causes the rack to pivot at B. The pivoting of the rack at B firstly causes strip-spring 1 to pivot at A, thereby winding the latter, as a result of end 24*a* of rack 24 pressing on free end 1*a* of strip-spring 1 and also causes first toothed sector 7 of minute-counter 5 to pivot, driven by toothing 24*b* in the direction of arrow f. Since second toothed sector 8 and minute-counter arbor 10 are integral with first sector 7, they are driven by the same angle and reset to zero the minute indicator members, and particularly index 12. During its rotation, second toothed sector 8 of minute-counter 5 meshes with drive wheel 46, 48, but owing to the asymmetrical toothing of planetary wheels 54, the rotation of drive wheel 48 has no effect on planetary wheels 54, or on planetary wheel holder 50, which rotates freely. The seconds-wheel set and the rest of the gear train are therefore isolated by means of this uncoupling device while the minutes are reset to zero.

When zero-reset and winding button 22 is pressed, the seconds-counter is also reset to zero in a known manner.

During this zero reset and winding step, the energy required for operation of the chronograph is stored in strip-spring 1, which works in flexion.

The user then starts the counting by pressing the "start" button 30. As shown in FIG. 5, this causes lever 28 to tip in the direction of arrow a, which causes lever 32 to tip in the direction of arrow b, such that the end 34*a* of balance stop lever 34 is freed from the balance to release regulating system 4. The counting can then start. Energy is released by the strip spring whose end 1*a* presses on end 24*a* of rack 24 and pivots it at B in the opposite direction to the minute zero-reset and winding direction. As it pivots, toothing 24*b* drives first toothed sector 7 and thus second toothed sector 8 in the opposite direction to the minute zero-reset and winding direction. The minute indicator members start to turn at a rate of one graduation per minute. In this configuration, the second toothed sector 8 of minute-counter 5 meshes with drive wheel 46, 48, but owing to the asymmetrical toothing of planetary wheels 54, said planetary wheels 54 are locked so that the rotation of drive wheel 48 causes planetary wheel holder 50 to rotate, which in turn causes seconds-counter 6 to transmit the torque delivered by the strip-spring to the other gear train elements. The seconds indicator member starts to turn to indicate the seconds.

The balance and the indicator members can be stopped by a first press on push button 22 for a reading or for a timeout. As shown in FIG. 6, a first press on button 22 in the direction of arrow a causes lever 42 to pivot in the direction of arrow b, which causes levers 32 and 41 to move in the direction of arrow c to return balance stop lever 34 against balance **4*a* in order to lock it. The indicator members are stopped for an intermediate reading or a timeout. Lever 41 has also pivoted in the direction of arrow d to release lever 42, which falls on lever 40 to occupy its position for a zero-reset. Another press on the “start” button 30 restarts the chronograph mechanism, as described above, with no zero-reset. Another first press on button 22 stops the chronograph mechanism, as described above. A second press on button 22** resets the chronograph to zero, and rewinds the strip spring as already described above.

The chronograph mechanism according to the invention has sufficient constant torque to operate properly and is more compact than known chronograph mechanisms. The zero reset mechanism, and more specifically the minute-zero reset mechanism, also performs the function of winding the energy accumulator, so that no specific winding mechanism is required.

What is claimed is:

1. A chronograph mechanism comprising an energy accumulator, a regulating system, a chronograph counter train comprising a minute-counter having a minute wheel set and at least one minute indicator member, and a seconds-counter having a seconds wheel set and a seconds indicator member, a chronograph zero-reset mechanism comprising a minute zero-reset mechanism, wherein the minute zero-reset mechanism is arranged to cooperate with the minute wheel set, the minute indicator member being permanently integral with the minute wheel set, and wherein the chronograph counter train comprises an uncoupling device between the minute-counter and the seconds-counter, arranged to kinematically connect the minute wheel set and the seconds wheel set during the counting and to uncouple the seconds wheel set from the minute wheel set when the chronograph mechanism is reset to zero.

2. The chronograph mechanism according to claim 1, wherein the uncoupling device comprises a unidirectional mechanism having a drive direction of rotation for driving the seconds-counter via the minutes-counter during the counting and a free direction of rotation when the chronograph mechanism is reset to zero.

3. The chronograph mechanism according to claim 1, wherein the uncoupling device comprises a drive wheel set arranged to be driven by the minute-counter and a planetary wheel holder, which is arranged to drive the seconds-counter and on which at least one planetary wheel, cooperating with the drive wheel set, is mounted for free rotation, said planetary wheel being arranged to allow the planetary wheel holder to be driven by the drive wheel set during the counting and to let the planetary wheel holder rotate freely when the minutes are reset to zero.

4. The chronograph mechanism according to claim 3, wherein the drive wheel set comprises a drive pinion arranged to cooperate with the minute-counter and a drive wheel arranged to cooperate with the planetary wheel.

5. The chronograph mechanism according to claim 3, wherein the planetary wheel holder is arranged to carry n planetary wheels, where n is an integer number greater than or equal to 1, said planetary wheel holder being disposed substantially coaxially to the drive wheel arbor and being movably mounted to rotate about said arbor.

6. The chronograph mechanism according to claim 3, wherein the planetary wheel has an asymmetrical tooth profile arranged to lock with the drive wheel set during the counting and to rotate freely when the minutes are reset to zero.

7. The chronograph mechanism according to claim 1, wherein the minute wheel set comprises a first toothed sector arranged to cooperate with the energy accumulator and a second toothed sector arranged to cooperate with the uncoupling device, and wherein the first and second toothed sectors are integral in rotation.

8. The chronograph mechanism according to claim 7, wherein the first and second toothed sectors are integral with an arbor carrying a first minute indicator member on the side of the first toothed sector, and wherein the second toothed sector carries a second minute indicator member.

9. The chronograph mechanism according to claim 7, wherein the minute zero-reset mechanism comprises a rack arranged to cooperate with the first toothed sector of the minute-counter and mounted to pivot in one direction of rotation to reset the minute-counter to zero.

10. The chronograph mechanism according to claim 9, wherein the rack of the minute zero-reset mechanism is also mounted to pivot in an opposite direction of rotation to drive the chronograph counter train, and wherein the strip-spring is arranged to actuate said rack.

11. The chronograph mechanism according to claim 9, wherein the rack is further arranged to wind the energy accumulator when the minute-counter is reset to zero.

12. The chronograph mechanism according to claim 1, wherein the energy accumulator is a strip-spring.

13. A timepiece including a chronograph mechanism according to claim 1.

* * * * *